US011411893B2

(12) United States Patent
Kharshak (10) Patent No.: US 11,411,893 B2
(45) Date of Patent: Aug. 9, 2022

(54) SYSTEMS AND METHODS FOR MANAGING CHAT-BASED REGISTRATION WITH AN ONLINE SERVICE

(71) Applicant: The Toronto-Dominion Bank, Toronto (CA)

(72) Inventor: Inna Kharshak, Aurora (CA)

(73) Assignee: The Toronto-Dominion Bank, Toronto (CA)

( * ) Notice: Subject to any disclaimer, the term of this patent is extended or adjusted under 35 U.S.C. 154(b) by 47 days.

(21) Appl. No.: 16/526,234

(22) Filed: Jul. 30, 2019

(65) Prior Publication Data

US 2021/0036972 A1  Feb. 4, 2021

(51) Int. Cl.
| | | |
|---|---|---|
| *G06F 15/16* | (2006.01) | |
| *H04L 51/02* | (2022.01) | |
| *H04L 9/40* | (2022.01) | |
| *G06F 21/31* | (2013.01) | |

(52) U.S. Cl.
CPC .............. *H04L 51/02* (2013.01); *G06F 21/31* (2013.01); *H04L 63/0428* (2013.01)

(58) Field of Classification Search
CPC ..... H04L 51/02; H04L 63/0428; G06F 21/31; G06F 16/95; G06F 16/958; G06F 16/972; G06F 40/174
USPC ......................................................... 709/206
See application file for complete search history.

(56) References Cited

U.S. PATENT DOCUMENTS

| | | | |
|---|---|---|---|
| 7,548,884 B1 | 6/2009 | Thomas | |
| 9,652,805 B1 | 5/2017 | Clawson, II et al. | |
| 9,838,877 B2 | 12/2017 | Fitzgerald et al. | |
| 2005/0188210 A1* | 8/2005 | Perlin | G06F 21/83 713/183 |
| 2009/0094066 A1 | 4/2009 | Freudman et al. | |
| 2011/0040582 A1 | 2/2011 | Mullins | |
| 2013/0117048 A1 | 5/2013 | Bradshaw et al. | |
| 2013/0129076 A1* | 5/2013 | Kannan | H04M 3/5141 379/265.09 |
| 2013/0317860 A1 | 11/2013 | Schumann, Jr. | |

(Continued)

FOREIGN PATENT DOCUMENTS

| | | |
|---|---|---|
| CN | 108566334 | 9/2018 |
| KR | 20180085705 | 7/2018 |

OTHER PUBLICATIONS

IBM, IBM Case Study—Lotus Software; Celina Insurance Group streamlines collaborative processes with agents to stay ahead of the competition; ftp://public.dhe.ibm.com/software/uk/itsolutions/collaboration/lotusphere-comes-to-you-2009/celina-insurance-group-streamlines-collaborative-processes.pdf; Located Via Google; 2009.

(Continued)

*Primary Examiner* — Anthony Mejia
(74) *Attorney, Agent, or Firm* — Rowand LLP (57) ABSTRACT

A method for real-time management of chat session data is disclosed. The method includes: receiving data from a client device via a web-based form; receiving, from the client device, a request to initiate a chat session between the client device and the computing system; in response to receiving the request to initiate the chat session, providing a chat interface for a new chat session on a display of the client device; populating a form with select data from the received data; and transmitting an encrypted version of the form via the chat interface to the client device.

12 Claims, 7 Drawing Sheets

(56) References Cited

U.S. PATENT DOCUMENTS

| | | |
|---|---|---|
| 2013/0325518 A1 | 12/2013 | Hunter |
| 2014/0304505 A1* | 10/2014 | Dawson .............. H04L 63/0428 |
| | | 713/165 |
| 2016/0125371 A1* | 5/2016 | Grassadonia ........ G06Q 20/386 |
| | | 705/44 |
| 2016/0149839 A1* | 5/2016 | Yi .......................... H04L 51/04 |
| | | 709/206 |
| 2016/0300300 A1 | 10/2016 | Chen |
| 2017/0093857 A1* | 3/2017 | Hinohara ............ H04L 63/0876 |
| 2018/0048464 A1* | 2/2018 | Lim ...................... H04L 9/0894 |
| 2019/0126463 A1 | 5/2019 | Purushothaman |
| 2019/0173811 A1* | 6/2019 | Estrada ................... H04L 51/38 |
| 2019/0334916 A1* | 10/2019 | Asai .................... H04L 65/1069 |
| 2020/0082460 A1* | 3/2020 | Patidar ................. G06Q 20/12 |
| 2020/0128053 A1* | 4/2020 | Rosanuru ............. G06Q 30/016 |
| 2020/0244605 A1* | 7/2020 | Nagaraja ................ G16H 50/20 |
| 2020/0380020 A1* | 12/2020 | Layton ................ G06F 16/9535 |
| 2020/0402153 A1* | 12/2020 | Minkus ................ G06Q 50/188 |
| 2021/0209606 A1* | 7/2021 | Herlands ................. G06F 21/64 |

OTHER PUBLICATIONS

IBM; ASEAN News Room; Singapore; Hearti Lab Builds Watson-Powered Insurance Chatbot to help SM Human Resource Management Functions; https://www-07.ibm.com/ibm/sg/media/news/2017-08-02-sg.html?lnk=hmhmhmhmhmhmhm; Aug. 2, 2017.

* cited by examiner

SYSTEMS AND METHODS FOR MANAGING CHAT-BASED REGISTRATION WITH AN ONLINE SERVICE

TECHNICAL FIELD

The present disclosure relates to data communication and, in particular, to systems and methods for processing registration requests at an online service.

BACKGROUND

Various service products require a formal registration or initialization procedure. Such procedures are often conducted manually by an agent or an operator. For example, a personal banking product may require new purchasers to sign up using their personal information. An agent may receive user data, either in-person or over the phone, and manually input the data for processing a user registration. A manual sign-up process may introduce errors (e.g. erroneous spelling) and inefficiencies, adversely affecting a user's experience with the service.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a computing system. The computing device includes a communications module communicable with an external network, a memory, and a processor coupled to the communications module and the memory. The processor is configured to: receive data from a client device via a web-based form; receive, from the client device, a request to initiate a chat session between the client device and the computing system; in response to receiving the request to initiate the chat session, provide a chat interface for a new chat session on a display of the client device; populate a form with select data from the received data; and transmit an encrypted version of the form via the chat interface to the client device.

In some implementations, the processor may be further configured to provide, via the display of the client device, a selectable user interface element for requesting to initiate the chat session.

In some implementations, the processor may be further configured to process the received data to obtain a first value associated with a first product, wherein the form is populated based on the first value and select data from the received data.

In some implementations, the processor may be further configured to receive, from the client device, user input of login credentials, wherein the chat interface for a new chat session is provided upon determining that the inputted login credentials are associated with an authorized user.

In some implementations, the processor may be further configured to store the received data in association with a user account for the authorized user.

In some implementations, populating the form may comprise retrieving the stored received data during the new chat session.

In some implementations, the processor may be further configured to: receive, from the client device via the chat interface, the encrypted form containing additional information inputted by a user of the client device; and store data from the received encrypted form in association with an account of the user.

In some implementations, the processor may be further configured to extract data from the received encrypted form and save the extracted data in a database.

In some implementations, the encrypted form may be transmitted as an attachment via the chat interface.

In some implementations, the processor may be further configured to: obtain a first value associated with a first product based on the received data; and generate a unique, non-modifiable identifier for the first value for associating the form with the first value.

In another aspect, the present disclosure describes a method for real-time management of chat session data. The method includes: receiving, from a client device associated with an entity, input including a selection of a vehicle and personal data for the entity; obtaining value data for the selected vehicle; obtaining pre-qualification information for the entity based on the personal data for the entity and the value data for the selected vehicle; determining, based on the pre-qualification information for the entity, that the entity is qualified; and in response to determining that the entity is qualified, sending, to a computing system associated with a dealer for the selected vehicle, a pre-populated resource request, the pre-populated resource request including at least a portion of the personal data.

Other example embodiments of the present disclosure will be apparent to those of ordinary skill in the art from a review of the following detailed descriptions in conjunction with the drawings.

In the present application, the term "online service" is intended to broadly refer to a service that is provided by a service provider via a computer network, such as the Internet. An online service may be a service product that is offered online, or a service which manages products that are purchased and/or accessed online. For example, an insurance company's servers may provide online registration services for insurance policies which are purchased online (e.g. from the company's own website or via a partner, such as a bank institution, and its mobile product offerings). As another example of an online service, a financial institution may offer mobile banking services for customers and account holders of the financial institution. An online service is typically accessed via a website and/or a mobile application on client devices.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In an aspect, the present application provides a method for automating a registration process for an online service. User data is received at a server associated with the online service, and a request is received from a device of the user to initiate a chat session between the user device and a server administering the registration. In response to receiving such request, the server provides a chat interface for a new chat session on a display of the user device. A registration form for the data-inputting user is pre-populated by the server using select data from the received user data, and an encrypted version of the pre-populated form is transmitted via the chat interface to the user device. The registration form can then be processed at the user device before being transmitted back to the server-end.

In another aspect, the present application provides a method for updating user account data in a data store maintained by a server. The server receives, via a client device, user data and a request to initiate a chat session. In response to receiving the request, the server provides a chat interface for a new chat session on a display of the client device. The server pre-populates a form based on the received user data and at least a first value associated with a product identified based on the received user data, and transmits the pre-populated form to the client device. Once the form is completed by the user at the client device, it is transmitted back to the server for further processing. The chat session data, which may include the received user data, the first value, and other content (e.g. text, images, audio, etc.), is then associated with a specific user account. In particular, the chat session data may be associated with an account of a user that is authenticated for access of the server or an online service administered by the server.

In another aspect, the present application provides a technique for real-time handling of user-generated data prior to handing off the data to a registration server for an online service. As a user interacts with a web-based form or survey document (e.g. by inputting user data), a chat between a device of the user and a registration server may be initiated at the request of the user. In particular, a chat interface for a new chat session may be provided on the user device. A registration form for registering with the online service may be populated based on user-inputted data, including, in some cases, message content of the chat session. The pre-populated registration form is then encrypted and transmitted to the user via the chat interface. A completed registration form may be sent back to the server, via the chat interface, for further processing to register the user with the online service. For example, an encrypted version of the completed registration form may be sent to the server.

Figure 1:
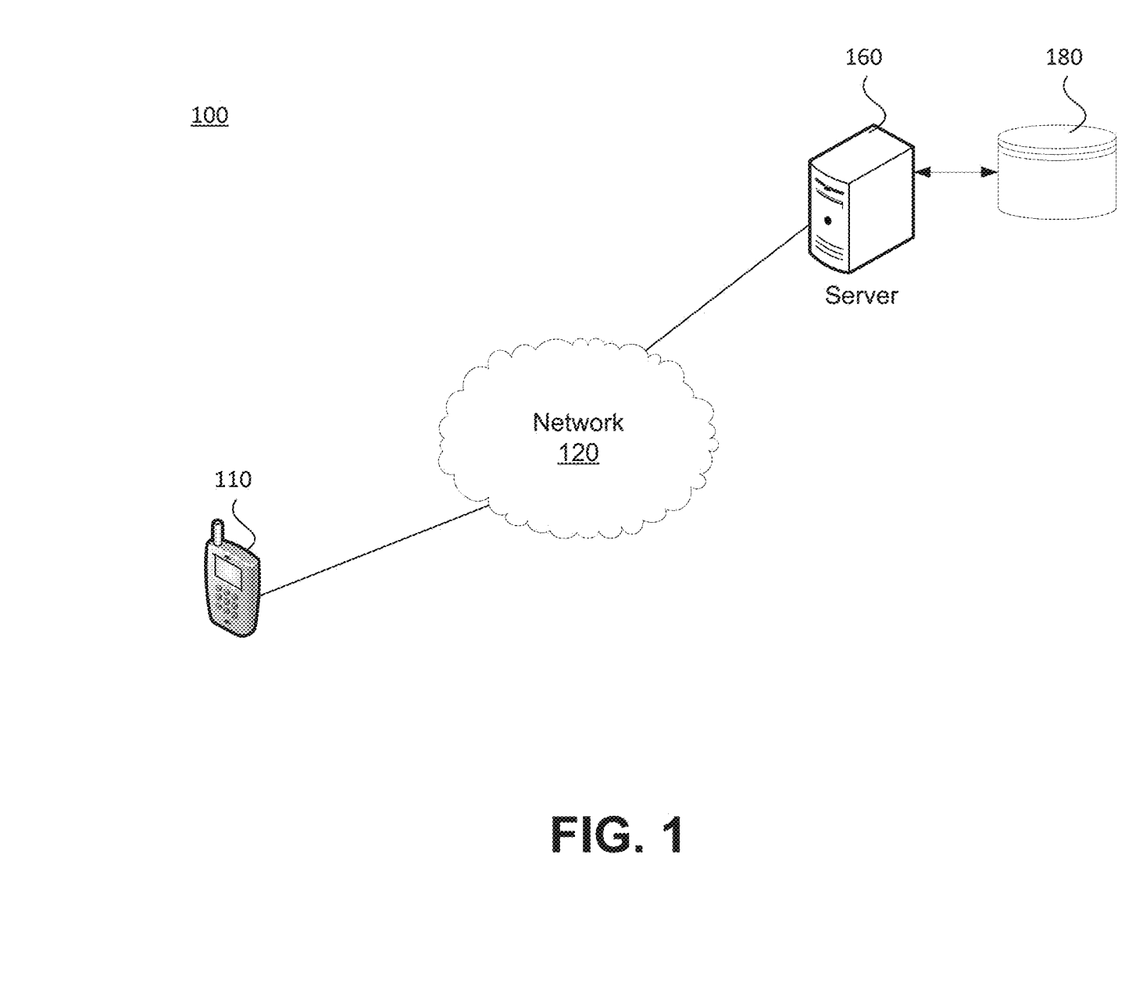
FIG. 1 is a schematic operation diagram illustrating an operating environment of an example embodiment.

FIG. 1 is a schematic diagram illustrating an operating environment of an example embodiment. In particular, FIG. 1 illustrates exemplary components of a system 100 for processing requests to register at an online service. As a specific example, the system of FIG. 1 may be implemented to facilitate purchase of a product and subsequent registration of a user in association with the purchased product via an online service or portal. As a user interacts in real-time with an online service to purchase a product, the user may provide data which can be used in registering the user in association with the product at the online service. A request for registering at an online service may originate from a device associated with the user. In particular, a user may request, using their device, to register with an online service based on data inputted by the user on their device. The registration request may be routed to various components of the system 100 via a network 120.

As illustrated, a server 160 (which may also be referred to as a server computer system) and client device 110 communicate via the network 120. The client device 110 is a computing device that may be associated with an entity, such as a user or client, having resources associated with the server 160. For example, the server 160 may track, manage, maintain, and/or lend resources to the entity. The resources may, for example, be computing resources, such as memory or processor cycles. By way of further example, the resources may include stored value, such as fiat currency, which may be represented in a database. For example, the server 160 may be coupled to a database 180, which may be provided in secure storage. The secure storage may be provided internally within the server 160 or externally. The secure storage may, for example, be provided remotely from the server 160. For example, the secure storage may include one or more data centers. The data centers may, for example, store data with bank-grade security.

The database 180 may include records for a plurality of accounts and at least some of the records may define a quantity of resources associated with an entity. For example, the entity that is associated with the client device 110 may be associated with an account having one or more records in the database. The records may reflect a quantity of stored resources that are associated with the entity. Such resources may include owned resources and, in at least some embodiments, borrowed resources (e.g. resources available on credit). The quantity of resources that are available to or associated with an entity may be reflected by a balance defined in an associated record such as, for example, a bank balance.

The server 160 may, for example, be a financial institution server and the entity may be a customer of a financial institution operating the financial institution server. In some embodiments, the server 160 may be a server that is associated with and/or operated by an insurance company.

The client device 110 may be used, for example, to configure a data transfer from an account associated with the client device 110. More particularly, the client device 110 may be used to configure a data transfer from an account associated with an entity operating the client device 110. The data transfer may involve a transfer of data between a record in the database 180 associated with such an account and another record in the database 180 (or in another database such as a database associated with another server (not shown) which may be provided by another financial institution, for example, and which may be coupled to the server 160 via a network). The other record is associated with a data transfer recipient such as, for example, a bill payment recipient. The data involved in the transfer may, for example, be units of value and the records involved in the data transfer may be adjusted in related or corresponding manners. For example, during a data transfer, a record associated with the data transfer recipient may be adjusted to reflect an increase in value due to the transfer whereas the record associated with the entity initiating the data transfer may be adjusted to reflect a decrease in value which is at least as large as the increase in value applied to the record associated with the data transfer recipient.

The client device 110 may be used to facilitate purchase actions of an entity associated with the client device 110. For example, the client device 110 may be configured to request information relating to one or more insurance products that are offered by an operating entity of the server 160. The products may, for example, be offered by an insurance company that is affiliated with a financial institution. The client device 110 may also be configured to receive user input of various information, such as personal data (e.g. identifying information, financial information) and product selections and/or preferences of the purchaser entity, which form the basis for obtaining an estimate of a value of a selected insurance product. Once a product is selected, the client device 110 may be used to transmit additional user information to the server for completing registration of the purchaser entity in association with the selected product. For example, the client device 110 may prompt a purchasing user to input user information into a registration form that is subsequently transmitted to the server. The inputted information may, in some embodiments, be encrypted at the client device prior to being sent to the server.

The client device 110, the operator computing system 140, and the server 160 may be in geographically disparate locations. Put differently, the client device 110 may be remote from at least one of the operator computing system 140 and the server 160.

The client device 110, the operator computing system 140, and the server 160 are computer systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the server 160 may provide both data transfer processing (e.g., bill payment) and data holding (e.g., banking) functions. That is, the server 160 may be both a financial institution server and also a bill payment processing server. The server 160 may, in some embodiments, be a proxy server, serving as an intermediary for requests from client devices 110 to register with an online service. For example, the server 160 may be a proxy connecting client devices 110 to servers or data stores processing product purchases and subsequent user registration at an online service offering the products.

In some embodiments, the server 160 may be associated with an insurance company that offers various insurance policy products. In particular, the server 160 may administer functions, such as policy purchase processing, product registrations, and user data management, relating to services provided by an insurance company. For example, the server 160 may be configured to receive and process, in real-time, user data from devices of users that purchase insurance policy products, and handle the registration of those users based on the received data.

Figure 2:
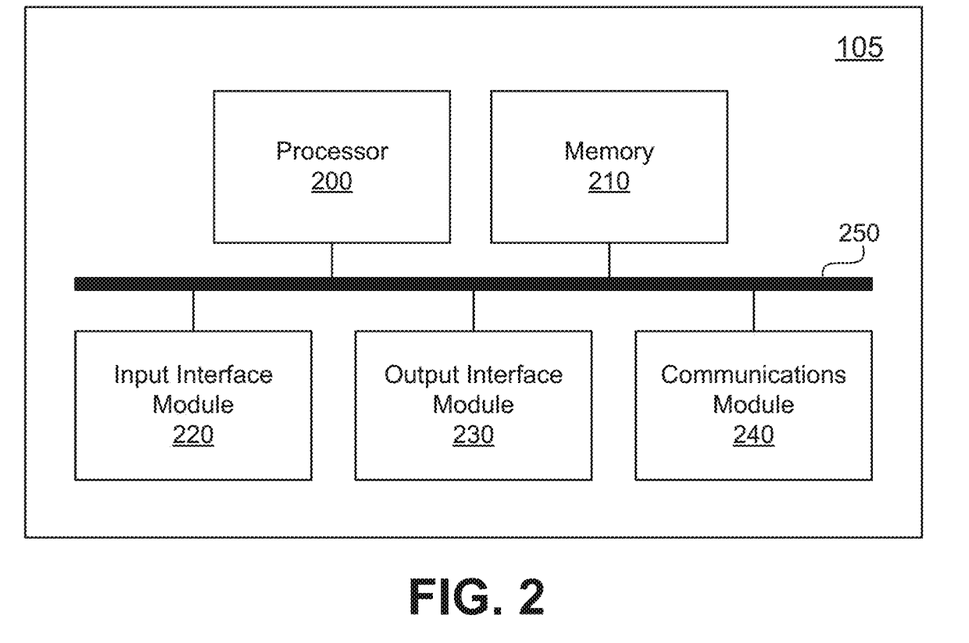
FIG. 2 is a high-level schematic diagram of an example computing device.

FIG. 2 is a high-level operation diagram of the example computing device 105. In some embodiments, the example computing device 105 may be exemplary of one or more of the client device 110, the operator computing systems 140, and the server 160. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally or alternatively, instructions may be executed by the processor 200 directly from read-only memory of memory 210.

Figure 3:
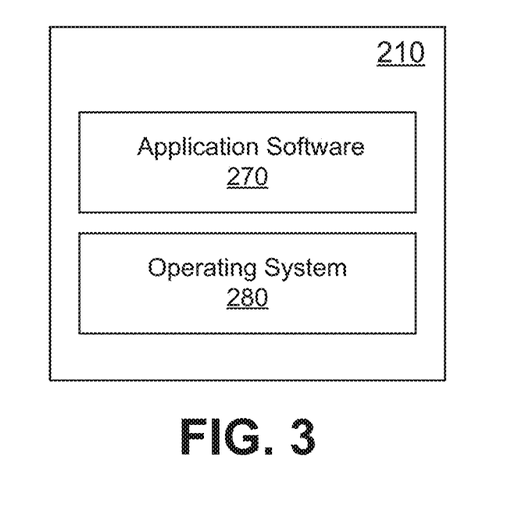
FIG. 3 shows a simplified organization of software components stored in memory of the example computing device of FIG. 2.

FIG. 3 depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing particular functions. The application software 270 may, for example, include a mobile banking application. A mobile banking application may be used for performing various personal and business banking activities. In particular, a mobile banking application may allow a user to purchase and sign up for a financial (e.g. banking, insurance, etc.) product offered by a bank institution. For example, a mobile banking application may provide a functionality for purchasing an insurance product and registering a user of the mobile banking application with a selected product by associating an account of the user with the product.

A user interface of the mobile banking application may present products data to the purchaser entity and facilitate entry of input, such as personal data, product selection and/or preferences, etc. The mobile banking application may provide a chat or messaging interface. That is, the user interface of the mobile banking application may include a chat interface for facilitating messaging between the computing device 105 and a remote computer (e.g. computer operated by a remotely located agent). The chat interface may be provided at the instruction of a server which controls output data of the mobile banking application on the computing device 105. The mobile banking application may be a stand-alone application, such as a mobile app, or integrated into another application or software module resident on the example computing device 105 as a sub-function or feature.

The mobile banking application is associated with a backend application server. In at least some embodiments, a server which manages an online service may also serve as the backend application server for the mobile banking application. In particular, various functions of the mobile banking application may be provided, at least in part, by a server. For example, a server associated with a bank institution may perform backend services of the mobile banking application.

In at least some embodiments, the application software 270 also includes a web browser application. Similar to the mobile banking application, the web browser application may facilitate various functions relating to purchase and registration of a product that is offered at an online service. For example, a graphical user interface of a web browser application may provide a product selection and purchase interface for purchasing a product that is offered by an online service, a web-based form for inputting user data, and a chat interface for a chat session between a user of the computing device 105 and a server associated with the online service.

Figure 4:
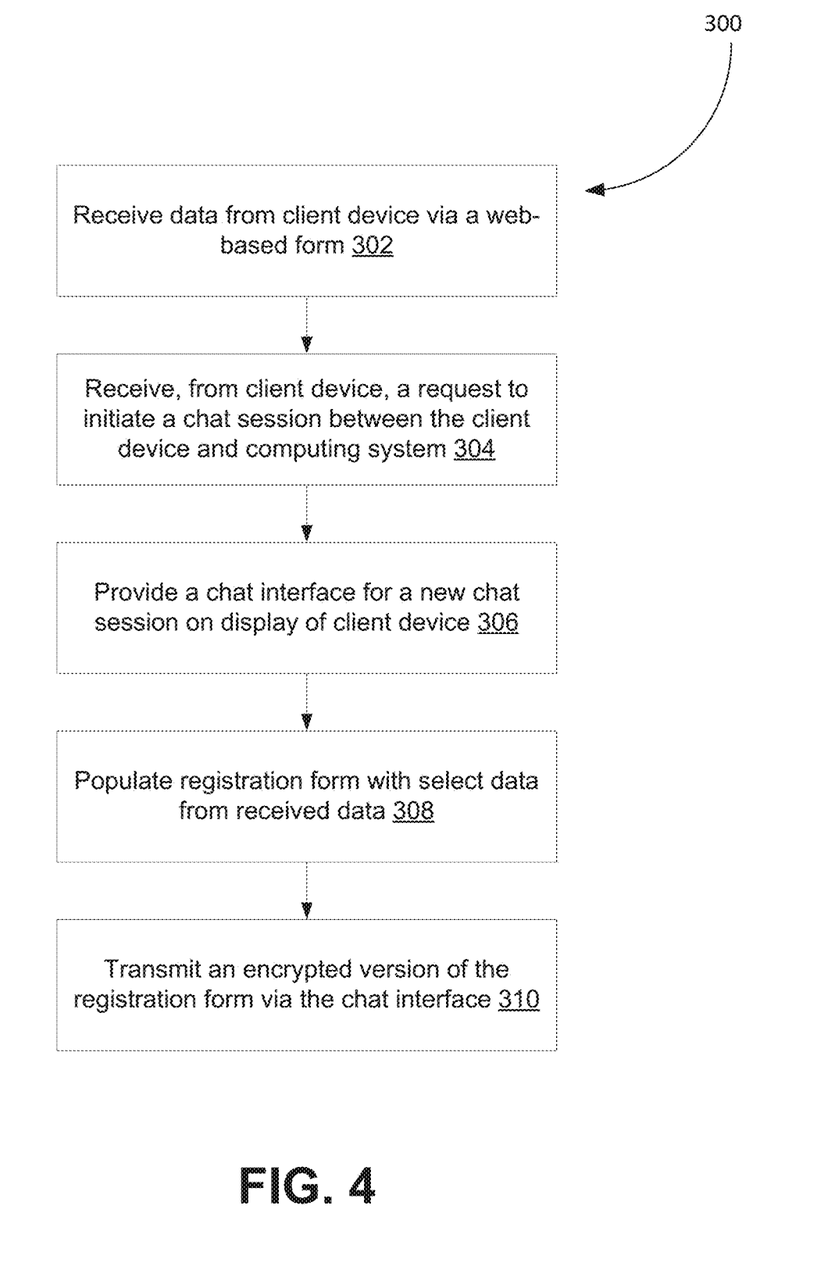
FIG. 4 shows, in flowchart form, an example method for processing chat-based registration of a user with an online service.

Reference is made to FIG. 4, which shows, in flowchart form, an example method 300 for processing chat-based registration at an online service. Specifically, the method 300 allows for handling requests, in real-time, for registering a user at an online service based on exchange of data via a chat interface. For example, the operations of the method 300 may be performed in processing a product purchaser and subsequent registration of a user in association with the purchased product at an online service.

Operations 302 and onward are performed by one or more processors of computing devices such as, for example, the processor 200 (FIG. 2) of one or more suitably configured instances of the example computing device 105 (FIG. 2). The method 300 may be performed, for example, by a server system that is communicably connected to a client device associated with a banking account. For example, a server providing backend services for a mobile banking application on the client device may implement the method 300. In some embodiments, all or parts of the method 300 may be performed by a computer associated with an agent or operator that administers registration of a user at the online service. Such computer may, for example, be implemented as part of the server system.

The server provides a web-based form that is accessible on a website or via a mobile banking application on a client device. The web-based form may be a survey form or document that includes various data entry fields for receiving user-inputted data. For example, the web-based form may include a plurality of questions and selectable response options (e.g. presented graphically as options in a pull-down menu or multiple radio buttons) or text entry fields for receiving direct text-based responses. User input to the web-based form may include personal data such as name of user, address (e.g. billing, mailing, work), date of birth, and financial information (e.g. income, assets, outstanding debt obligations).

In operation 302, the server receives data, from the client device, via the web-based form. In particular, the server receives user data that is inputted into the web-based form. In some embodiments, the web-based form may only be accessible to an authenticated user. That is, only authorized users may access and input their user data in the web-based form. For example, users that have existing accounts at the server managing registration for the online service may be authorized to access the web-based form. The server may, for example, be a bank server which administers registration for various insurance products that are offered by an insurance company. Account holders at the bank server may be authorized to provide their user data in registering for insurance policies via the registration service provided by the bank server. A bank account holder may authenticate to the bank server for initiating an authenticated session to register with the insurance company.

More generally, a user having authentication credentials for authenticating (e.g. logging in) to the server which manages registration for the online service may access the web-based form in an authenticated user session. The user-inputted data may then be associated with the user session.

In particular, the inputted user data may be associated with an account or profile of the authenticated user. For example, the data that is inputted into the web-based form in an authenticated session may be saved in association with an account/profile of the user at the server and/or the online service. The authentication of a user may be performed by the server, or via a third-party service using standards for providing delegated access for a user device (e.g. OAuth).

In at least some embodiments, the web-based form may be associated with a particular product that is offered at the online service. For example, an insurance product that is offered through an online service, such as a website of a bank/insurance institution or in a mobile banking application, may be associated with a web form for inputting information relevant to purchase and/or registration of a selected insurance product. The information that is inputted into the web-based form may include information about an object that is insured, such as a vehicle (e.g. vehicle type, make, model, trim level, etc.) or a home (e.g. address, year of build, square footage). The inputted information may include information about the insured entity, such as age, height, weight, and personal and family medical history of an individual.

The client device may provide a product selection interface with which a user can interact to indicate choices of product and/or product preference information. For example, the product selection interface may present a plurality of financial products and their product specifications to the user, and display a progressively filtered list of products based on user input of preferences and selection criteria.

Figure 7A:
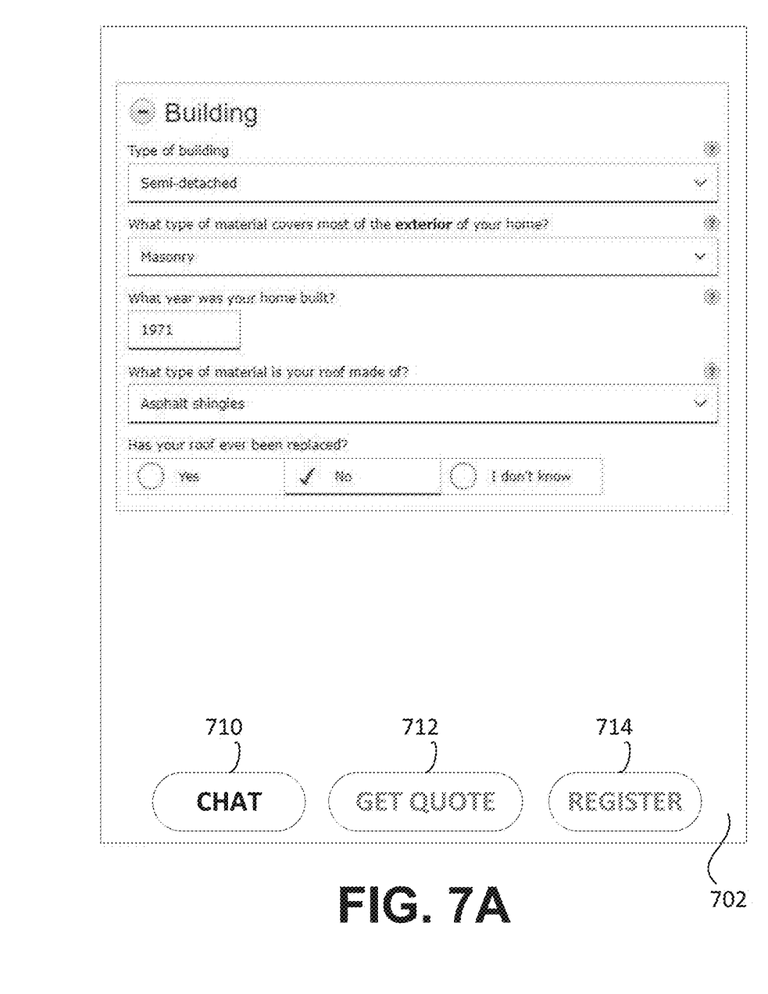
FIGS. 7A to 7C show example display pages of a user interface for registering with an online service.
Figure 7B:
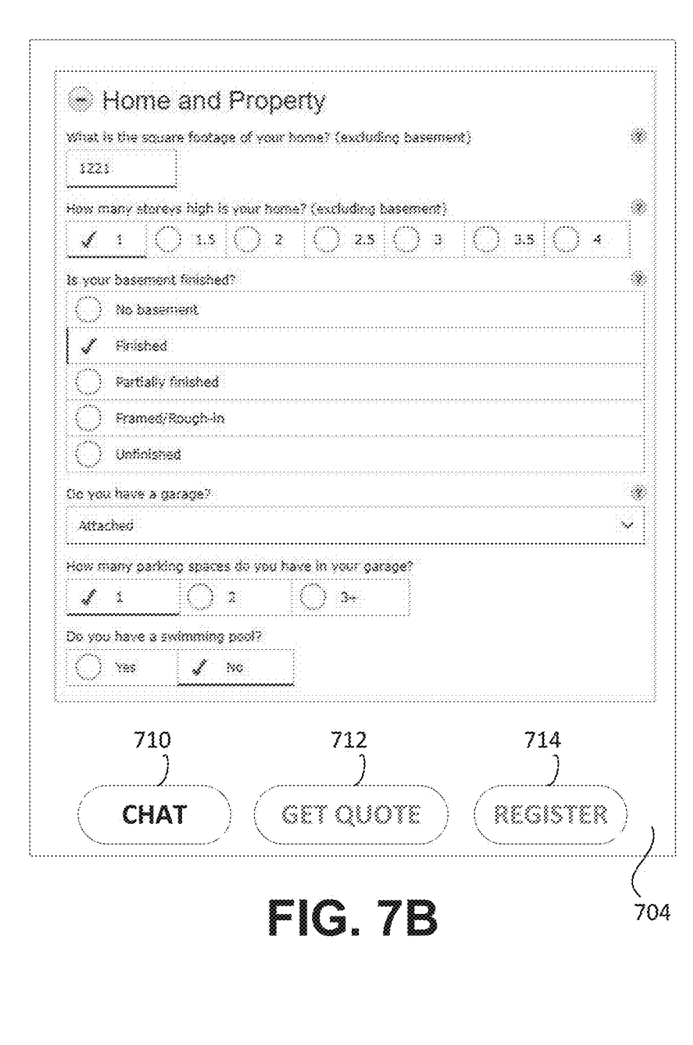
Figure 7C:
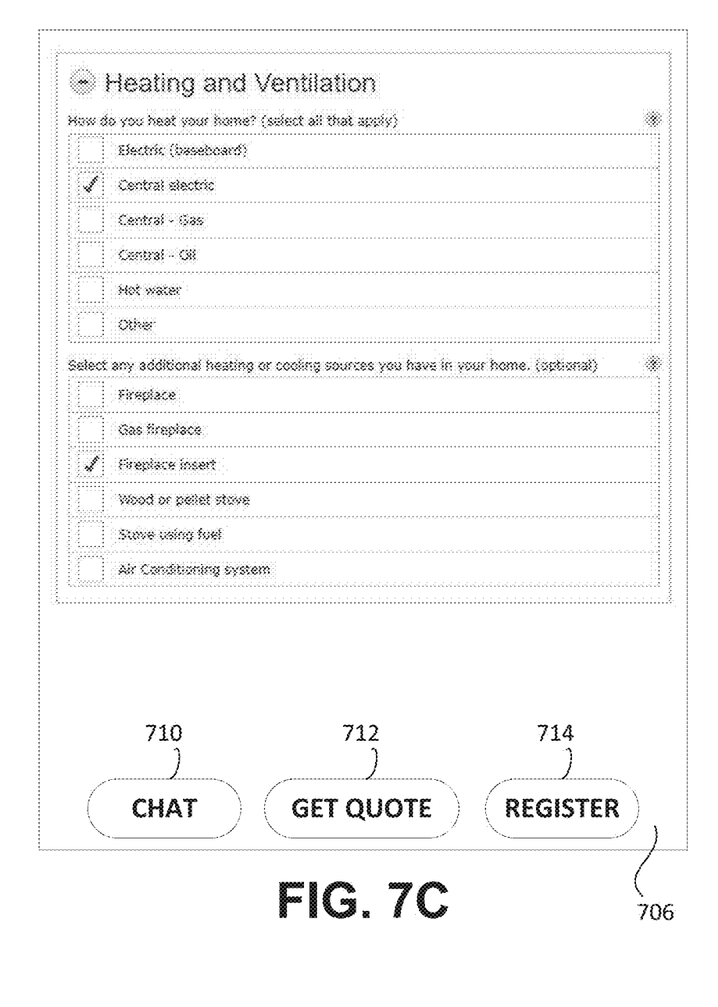

FIGS. 7A-7C show display pages of an example user interface provided on a client device for processing registration with an online service. Specifically, the screens 702, 704 and 706 show a plurality of input data fields of a web-based form which may be populated by a user. The screens 702, 704 and 706 may, for example, be provided on a web browser application on the client device. In the particular example of FIGS. 7A-7C, the input data fields receive information that are relevant to identifying a home insurance policy. The screens 702-706 display user interface elements corresponding to functionalities for initiating a chat session (710), getting a quote for an insurance product (712), and registering the user for an insurance policy (714). In screens 702 and 704, the text for the UI elements 712 and 714 are greyed out, indicating that the corresponding functionalities are not available. For example, the UI elements may be greyed out if there is insufficient data currently entered in the web-based form. In screen 706, all three functionalities of the UI elements 710, 712 and 714 are available (for example, indicating that sufficient data has been entered by the user). That is, all three options of initiating a chat session, getting a quote for the insurance product, and submitting a request to register for the insurance policy are available via the user interface elements 710, 712 and 714, respectively.

In operation 304, the server receives, from the client device, a request to initiate a chat session between the client device and the server. The chat session facilitates managing registration of a user at an online service. In some embodiments, the chat session may be for registering a user in association with a selected product, such as a financial (e.g. insurance) product, that is offered at an online service. For example, a user of the client device may indicate a selection of a product to purchase from various products offered by an entity through an online service, and subsequent to indicating the selection, request to initiate a chat for registering the user in association with the selected product.

In operation 306, in response to receiving the request, the server provides a chat interface for a new chat session, for presenting on a display of the client device. In particular, a new chat session may be created between the client device and a computer associated with the server. The computer may, for example, be associated with an agent or operator for handling registration of the user at the online service. In some embodiments, the chat session may be implemented as an instant messaging function that is accessible from the client device. For example, the chat session may be provided in a mobile banking application resident on the client device for instantaneously sending and receiving messages to and from an agent's computer. More generally, the chat session may be created as a real-time messaging instance for exchanging messages between the client device and the server.

The server then populates, in operation 308, a form with select data from the data received in operation 302. Specifically, a registration form which may be used to register a user at the online service, is populated using information provided, via the client device, by the user. The registration form may be a static form that includes various fields that are relevant to the user registration. In some embodiments, the choice of form to populate with the data received from the user may be based on a product that is selected by the user at the online service. For example, if the user selects an insurance product that is offered by an insurance company affiliated with a bank institution, the registration form may be a form that contains specific fields for information required for registering a user with the selected insurance product.

In operation 310, the server transmits an encrypted version of the form to the client device, via the chat interface. That is, the form that is pre-populated by the server using data inputted by the user is first encrypted and transmitted to the client device. The server implements a suitable cryptographic (e.g. symmetric or public key) algorithm for encrypting the form prior to its transmission. In some embodiments, the encrypted form may be transmitted as an attachment in the chat interface. For example, during an active chat session between the client device and the server, the encrypted form may be pushed by the server to the user as a file attachment. The encrypted form may be decrypted upon receipt at the client device, and the user may access the form to input information in one or more data fields of the form. For example, a copy of the encrypted form may be downloaded to the client device, or the form may be directly accessible within the chat interface.

In some embodiments, the server may determine when to transmit an encrypted version of the registration form based on whether a sufficient level of information has been provided by the registering user. For example, as the registration form is populated with data received from the user, the server may determine whether a threshold level of detail has been provided for completion of the registration form. The server may, for example, check if one or more specific fields of the registration form may be pre-populated based on the data provided by the registering user. Upon determining that sufficient information has been received from the registering user, the server may transmit the pre-populated registration form to the client device.

Figure 5:
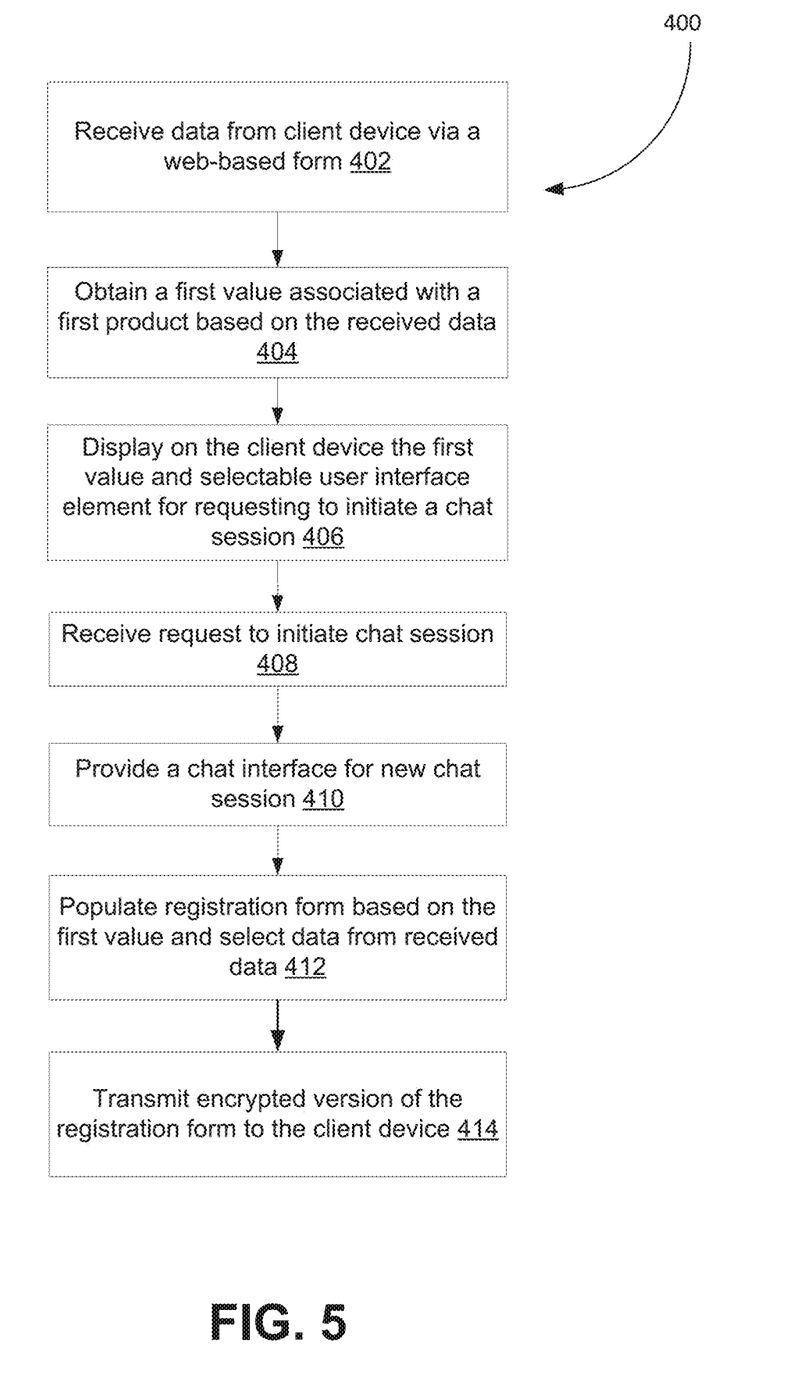
FIG. 5 shows, in flowchart form, another example method for processing chat-based registration of a user with an online service.

Reference is made to FIG. 5, which shows, in flowchart form, another example method 400 for processing, in real-time, chat-based registration at an online service. Operations 402 and onward are performed by one or more processors of computing devices such as, for example, the processor 200 (FIG. 2) of one or more suitably configured instances of the example computing device 105 (FIG. 2). The method 400 may be performed, for example, by a server system that is communicably connected to a client device of a user having a banking account managed by or accessible for the server. For example, a server providing backend services for a mobile banking application on the client device may implement method 400. In some embodiments, all or parts of the method 400 may be performed by a computing system associated with an agent or operator that administers registration of a user in association with a product offered at the online service.

In operation 402, the server receives data from a client device via a web-based form, in a similar manner as in operation 302. The web-based form may, for example, be for requesting registration of a user with a product offered at the online service. In particular, the web-based form that is used for providing information to the server may correspond to a specific product that is available via the online service. For example, if the user selects a particular product at the online service, a web-based form containing data fields that are relevant for the product may be presented to the user on the client device.

In operation 404, the server obtains a first value associated with a selected product based on the received data. In particular, the server processes the data received from the client device (i.e. data inputted on the web-based form) to obtain a value associated with the selected product. For example, if a user selects a specific product (e.g. insurance product) and provides user data in a web-based form corresponding to the selected product, whether in a mobile banking application or a browser application on the client device, the server may obtain a value associated with the product using information inputted by the user on the client device.

The first value may, in some embodiments, be an estimate of a cost, or quote, for the selected product. To derive such an estimate, the server may input the received user data in a product value computation module. For example, if the selected product is an insurance product, the server may input the user data in an automatic rating engine that is configured with rating data for generating a quote based on the user data. The server may itself implement the product value computation module, or transmit the received user data to a value computation service that is remote from the server (e.g. a computing system associated with a third-party service provider).

Once the first value associated with the selected product is obtained by the server, the first value is provided to the client device for display on an output interface of the client device, in operation 406. In particular, the server may generate a user interface for presenting on the client device that includes display of the obtained first value. The user interface may also include at least one selectable user interface element for requesting to initiate a chat session between the client device and the server. The at least one selectable user interface element may be associated with various functions relating to the selected product. For example, the user interface presented on the client device may include selectable elements for, among others, initiating a chat session, requesting to bind (or fix) the obtained first value for the selected product, registering the user and/or the selected product with the online service, and applying to procure the selected product.

The server receives a request to initiate a chat session in operation 408, for example, via receipt of an input to select a user interface element associated with an option to chat. In operation 410, the server provides a chat interface for a new chat session. Operations 408 and 410 correspond to and are performed in similar manner as operations 304 and 306 of method 300, and features described above with reference to operations 304 and 306 can be performed at operations 408 and 400, respectively.

In operation 412, the server pre-populates the registration form based on both the obtained first value associated with the selected product and data received from the user. The registration form may thus serve to inform the user of the first value while also allowing the user to input their data in confirming their acceptance of the selected product and subsequent registration. For example, if the selected product offered at the online service is an insurance product, the registration form may be used for signing up the user for a specific insurance policy. The server may obtain an estimate of the cost of the insurance policy based on data provided by the user, and a registration (or application) form for the policy may be pre-populated by the server using the obtained estimate and select user data. A registration form for an insurance policy product may be pre-populated with, at least, the following information: user identifying information (e.g. name, age), occupation, financial information, type of selected insurance, details of selected policy, and details of an object being insured (e.g. vehicle, home, etc.).

In some embodiments, the registration form may be pre-populated based on the message content of the chat session between the client device and the server. For example, the server may analyze the message content of a chat to identify information which may be suitable for entering in data entry fields of the registration form. In particular, the registration form may be pre-populated using both the data that is inputted by the user in the web-based form and the information which may be extracted from the message content of the chat session between the client device and the server. The server may, for example, employ a natural language processing algorithm to parse the message content and extract information for populating the registration form.

In operation 414, the server transmits an encrypted version of the pre-populated registration form to the client device, for example, via the chat interface between the client device and the server. The pre-populated registration form may include both editable and non-editable data fields. For example, the estimate of the cost of a product that is determined based on user-inputted information may be a fixed value that is not editable. Moreover, not all data fields of the registration form may be populated in operation 412. That is, the registration form may include one or more data fields that are left unfilled when it is transmitted to the client device.

In at least some embodiments, the server may associate the obtained first value and the received user data with the particular chat session established between the client device and the server. In particular, a specific chat session may be uniquely identified (e.g. using a session identifier), and the obtained first value and user data exchanged via the chat interface for the chat session may be associated with the chat session. For example, in the context of registration for a particular product offering at an online service, an obtained value of the product and user data that is exchanged via a chat interface during the registration process may be stored in association with an identifier of the specific chat session.

The chat session of a particular registration process may be associated with a user that is authorized for access to the server or a service that is maintained by the server. The chat session may, for example, be an authenticated session. An authenticated session is a chat session which is requested and/or initiated by an authenticated user to a server/service. When a request to initiate a chat session is received, the server may check whether the requesting user is an authenticated user. The server may receive, from the client device, user input of login credentials, and the chat interface for a new chat session may be provided upon determining that the inputted login credentials are associated with an authorized user. An authorized user may be a user having an account that is stored in a database or an online service maintained by the server. For example, the server may be associated with a bank institution, and an authorized user may be a user having one or more accounts with the bank institution. The user can, upon authentication to the server, engage an authenticated chat session that is initiated by the server.

In some embodiments, the server may perform authentication for an online service that is provided by a third-party. For example, the server may authenticate users that have one or more accounts that are managed by or accessible to the server, and upon successful authentication, allow the authenticated user access to a third-party online service. In particular, a user that is authenticated in this way may be able to access a chat-based registration process for the third-party online service. In some other embodiments, the user inputted login credentials may be associated with a third-party system, and the authentication to the server and/or the online service may be performed using various standards (e.g. OAuth) for providing the client device with delegated access. That is, a user may access the server/online service via authorized third-party access, for example, by using access tokens, and engage an authenticated chat session for chat-based registration of the user with the online service. For example, a user may be authenticated to the server via a third-party application, and upon successful authentication, the user may gain access to an authenticated chat session.

The first value of the product obtained by the server and the user inputted data may be associated with the unique chat session (i.e. between the client device and the server) and/or the authenticated user (e.g. an account of the authenticated user). In particular, when the user is an authenticated user, the obtained first value of the product and the user inputted data may be provided to the chat session using an account or profile associated with the user. For example, the first value of the product and/or the user data may be saved in association with a user account or profile of the authenticated user. The user data may, for example, be stored in a user accounts database, in association with a unique account of the authenticated user. The server may then access and retrieve this saved information during the (authenticated) chat session, for further processing of the information throughout a chat-based registration process. For example, the server may retrieve the stored user data when populating a registration form for the authenticated user prior to its transmission to the client device.

Figure 6:
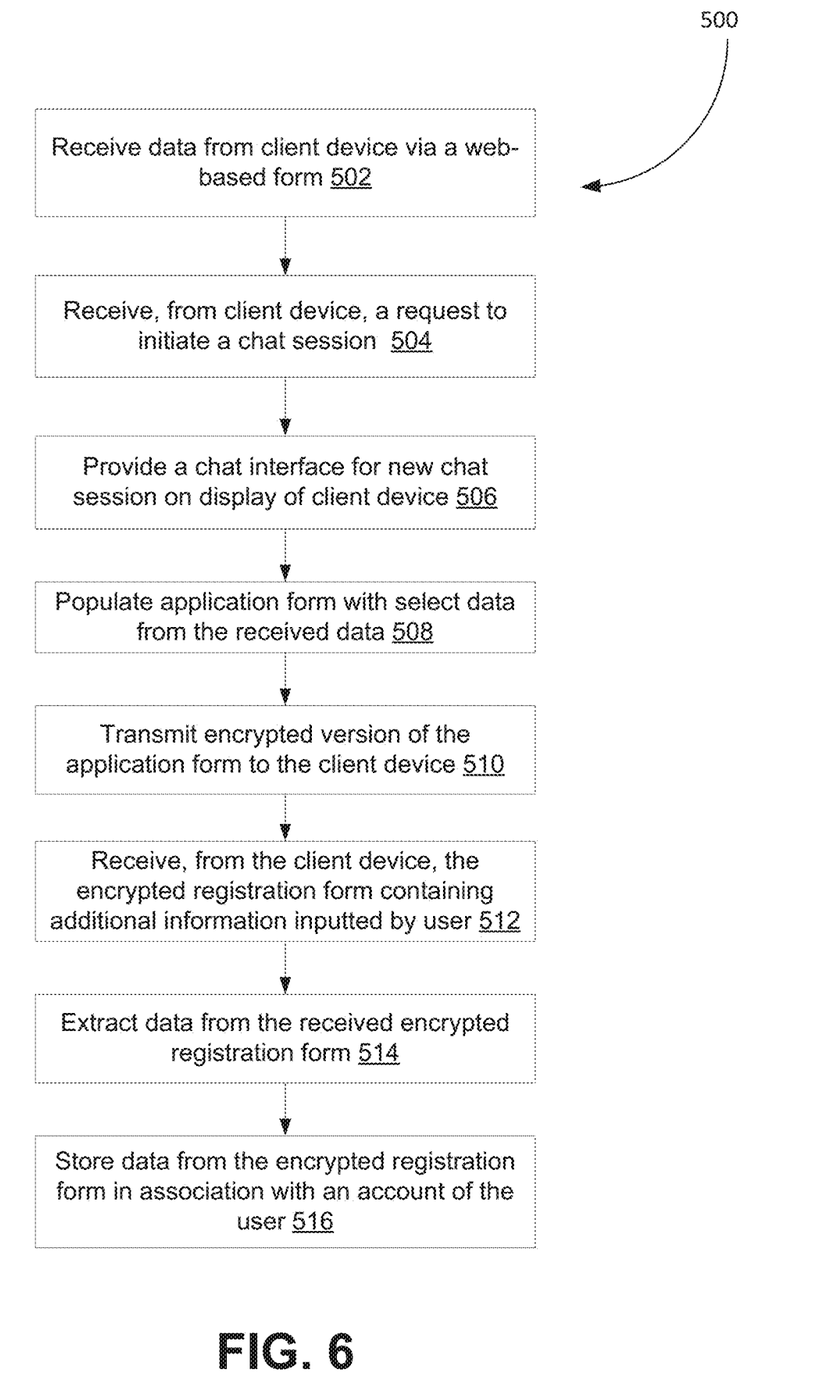
FIG. 6 shows, in flowchart form, another example method for processing chat-based registration of a user with an online service.

Reference is now made to FIG. 6, which shows an example method 500 for processing, in real-time, chat-based registration of a user with an online service. Operations 502 and onward are performed by one or more processors of computing devices such as, for example, the processor 200 (FIG. 2) of one or more suitably configured instances of the example computing device 105 (FIG. 2). The method 500 may be performed, for example, by a server system that is communicably connected to a client device of a user having a banking account managed by or accessible for the server. The operations of method 500 may be performed in addition to the operations of method 300 and/or 400 in a chat-based registration at an online service.

In operation 502, the server receives data from a client device via a web-based form, and the server receives a request to initiate a chat session in operation 504. In response to receiving the request, the server provides a chat interface for a new chat session on a display of the client device, in operation 506. The server pre-populates a registration form with select data from the received user data, in operation 508, and transmits an encrypted version of the registration form to the client device in operation 510. Operations 502 to 510 correspond to and are performed in similar manner as operations 302 to 310 of method 300.

After completing the registration form, the user may submit the form for transmission back to the server. In operation 512, the server receives, from the client device, the encrypted registration form containing additional information inputted by the user. The encrypted registration form may be received, for example, via the chat interface between the client device and the server that was established in operation 506. In particular, the received registration form may contain data which is additional to the pre-populated information in the registration form that was previously transmitted to the client device in operation 510. Upon receiving the encrypted registration form, the server may extract data from the received form, in operation 514. For example, the server may employ various text parsing techniques to extract data from the text input fields of the registration form.

In operation 516, the extracted data is stored in association with an account of the user. In some embodiments, the extracted data (e.g. parsed text) may be saved in a database of user accounts that are managed by or accessible to the server. The extracted data may be saved in association with at least one of a specific user account/profile or a unique chat session.

The server may be configured to perform additional processing of the data in the encrypted registration form that is received from the client device. For example, if the registration is for a product offering at the online service, the server may obtain a first value associated with a product selected by the user and associate the value with the user and the selected product. The server may, for example, provide a confirmation message to the user that an obtained first value of a selected product has been fixed for the user and provide the product to the user thereafter.

In some embodiments, the server may compare the user inputted information received at operation 502 with the user data that is received in the encrypted registration form transmitted from the client device in operation 512. The server may, for example, determine whether there are any discrepancies between the user data that was used for pre-populating the registration form prior to access by a user of the client device and the user data that was finally submitted in the completed registration form received in operation 512. If discrepancies in the data sets are detected, the server may prompt the user to provide confirmation of a change in the inputted data or otherwise resolve the detected discrepancies. For example, a prompt for confirmation of updated data in the input fields of the registration form may be provided in the chat interface of the chat session during the registration process.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
   a communications module communicable with an external network;
   a memory; and
   a processor coupled to the communications module and the memory, the processor being configured to:
      receive, from a client device, a request for registering a user in association with a selected product that is offered at a third-party online service, the request including data inputted by the user via a web-based form for registration;
      receive, from the client device, user input of login credentials for a resource account at the computing system and a request to initiate chat-based registration of a user associated with the resource account in association with the selected product at the online service;
      in response to receiving the request to initiate the chat-based registration and authenticating the user to the resource account based on the user-inputted login credentials, provide a chat interface for a new authenticated chat session on a display of the client device;
      process the user-inputted data to obtain a first value representing a quote for the selected product;
      store the user-inputted data and the first value in association with the resource account for the authenticated user;
      populate a form for registering the authenticated user in association with the selected product at the online service using the first value associated with the selected product and select data from the user-inputted data; and
      transmit an encrypted version of the populated form via the chat interface to the client device.

2. The computing system of claim 1, wherein the processor is further configured to provide, via the display of the client device, a selectable user interface element for requesting to initiate the chat session.

3. The computing system of claim 1, wherein the processor is further configured to:
   receive, from the client device via the chat interface, the encrypted form containing additional information inputted by a user of the client device; and
   store data from the encrypted form in association with the resource account of the user.

4. The computing system of claim 3, wherein the processor is further configured to extract data from the encrypted form and save the extracted data in a database.

5. The computing system of claim 1, wherein the encrypted form is transmitted as an attachment via the chat interface.

6. The computing system of claim 1, wherein the processor is further configured to:
   obtain a first value associated with a first product based on the user-inputted data; and
   generate a unique, non-modifiable identifier for the first value for associating the form with the first value.

7. A processor-implemented method, comprising:
   receiving, from a client device, a request for registering a user in association with a selected product that is offered at a third-party online service, the request including data inputted by the user via a web-based form for registration;
   receiving, from the client device, user input of login credentials for a resource account at a computing system and a request to initiate chat-based registration of session for registering a user associated with the resource account in association with the selected product at the online service;
   in response to receiving the request to initiate the chat-based registration and authenticating the user to the resource account based on the user-inputted login credentials, providing a chat interface for a new authenticated chat session on a display of the client device;
   processing the user-inputted data to obtain a first value representing a quote for the selected product;
   storing the user-inputted data and the first value in association with the resource account for the authenticated user;
   populating a form for registering the authenticated user in association with the selected product at the online service using the first value associated with the selected product and select data from the user-inputted data; and
   transmitting an encrypted version of the populated form via the chat interface to the client device.

8. The method of claim 7, further comprising providing, via the display of the client device, a selectable user interface element for requesting to initiate the chat session.

9. The method of claim 7, further comprising:
   receiving, from the client device via the chat interface, the encrypted form containing additional information inputted by a user of the client device; and
   storing data from the encrypted form in association with the resource account of the user.

10. The method of claim 9, further comprising extracting data from the encrypted form and saving the extracted data in a database.

11. The method of claim 7, wherein the encrypted form is transmitted as an attachment via the chat interface.

12. The method of claim 7, further comprising:
   obtaining a first value associated with a first product based on the user-inputted data; and
   generating a unique, non-modifiable identifier for the first value for associating the form with the first value.

* * * * *